(12) United States Patent
Baur

(10) Patent No.: US 11,841,261 B2
(45) Date of Patent: Dec. 12, 2023

(54) FILL STATE RADAR ANTENNA ASSEMBLY FOR MEASURING THE FILL STATE IN A CONTAINER

(71) Applicant: VEGA Grieshaber KG, Wolfach (DE)

(72) Inventor: Roland Baur, Königsfeld (DE)

(73) Assignee: VEGA Grieshaber KG, Wolfach (DE)

( * ) Notice: Subject to any disclaimer, the term of this patent is extended or adjusted under 35 U.S.C. 154(b) by 236 days.

(21) Appl. No.: 17/251,054

(22) PCT Filed: Jul. 2, 2019

(86) PCT No.: PCT/EP2019/067699
§ 371 (c)(1),
(2) Date: Dec. 10, 2020

(87) PCT Pub. No.: WO2020/011596
PCT Pub. Date: Jan. 16, 2020

(65) Prior Publication Data
US 2021/0239507 A1 Aug. 5, 2021

(30) Foreign Application Priority Data
Jul. 10, 2018 (DE) .................... 10 2018 211 422.6

(51) Int. Cl.
*G01F 23/284* (2006.01)
*G01S 7/03* (2006.01)
(Continued)

(52) U.S. Cl.
CPC .............. *G01F 23/284* (2013.01); *G01S 7/03* (2013.01); *H01Q 1/225* (2013.01);
(Continued)

(58) Field of Classification Search
CPC ......... G01F 23/284; G01S 7/03; H01Q 1/225; H01Q 9/0407; H01Q 13/02; H01Q 19/062
See application file for complete search history.

(56) References Cited

U.S. PATENT DOCUMENTS

| 6,741,201 B1 * | 5/2004 | De Jongth | G01V 3/12 342/22 |
| 8,842,035 B2 * | 9/2014 | Duvoisin, III | G01S 13/86 342/27 |

(Continued)

FOREIGN PATENT DOCUMENTS

| DE | 102006019688 A1 | 11/2007 |
| DE | 102007042043 A1 | 3/2009 |

(Continued)

OTHER PUBLICATIONS

German Office Action issue in German Application No. 10 2018 211 422.6, dated Jun. 4, 2019, 5 pages.

(Continued)

*Primary Examiner* — Peter M Bythrow
(74) *Attorney, Agent, or Firm* — Sterne, Kessler, Goldstein & Fox P.L.L.C.

(57) ABSTRACT

The present invention relates to a level radar antenna assembly for measuring a level in a container. The level radar antenna assembly comprises a transmitting antenna assembly for transmitting a transmission signal in the direction of a filling material surface of a filling material stored in the container, a receiving antenna assembly for receiving a transmission signal reflected at the filling material surface, and a housing. The transmitting antenna assembly and the receiving antenna assembly are integrated in the housing, the transmitting antenna assembly being larger than the receiving antenna assembly.

12 Claims, 2 Drawing Sheets

(51) Int. Cl.
- *H01Q 1/22* (2006.01)
- *H01Q 9/04* (2006.01)
- *H01Q 13/02* (2006.01)
- *H01Q 19/06* (2006.01)

(52) U.S. Cl.
CPC ......... *H01Q 9/0407* (2013.01); *H01Q 13/02* (2013.01); *H01Q 19/062* (2013.01)

(56) References Cited

U.S. PATENT DOCUMENTS

| | | | |
|---|---|---|---|
| 8,884,632 B2 | 11/2014 | Klofer et al. | |
| 2003/0151560 A1* | 8/2003 | Kienzle | A61P 37/02 343/786 |
| 2007/0279309 A1 | 12/2007 | Schultheiss et al. | |
| 2009/0128396 A1* | 5/2009 | Fehrenbach | H01Q 13/02 342/124 |
| 2009/0315758 A1* | 12/2009 | Jirskog | G01F 23/284 342/124 |
| 2010/0066594 A1* | 3/2010 | Kienzle | H01Q 13/02 343/753 |
| 2014/0208845 A1* | 7/2014 | Zlotnick | G01F 23/2962 73/290 V |
| 2014/0333470 A1* | 11/2014 | Blodt | G01F 23/284 342/124 |
| 2015/0241261 A1* | 8/2015 | Cheng | G01F 23/284 342/124 |
| 2016/0138957 A1* | 5/2016 | Blodt | H01Q 15/08 342/124 |
| 2017/0141454 A1* | 5/2017 | Welle | H01Q 21/065 |
| 2018/0003650 A1* | 1/2018 | Uchida | G01S 13/88 |
| 2018/0106602 A1* | 4/2018 | Welle | G01S 13/89 |
| 2018/0372531 A1* | 12/2018 | Waelde | H01Q 21/064 |
| 2019/0128728 A1* | 5/2019 | Fredriksson | H01Q 19/08 |
| 2019/0260107 A1* | 8/2019 | Baur | H01Q 1/40 |

FOREIGN PATENT DOCUMENTS

| | | |
|---|---|---|
| DE | 102008050329 A1 | 4/2010 |
| DE | 102013104699 A1 | 11/2014 |
| DE | 102015007698 A1 | 1/2017 |
| DE | 102016217614 A1 | 3/2018 |
| DE | 102017127191 A1 | 5/2019 |
| EP | 0957371 A2 | 11/1999 |
| EP | 1 783 517 A1 | 5/2007 |
| EP | 2060883 A1 | 5/2009 |
| EP | 3165883 A9 | 6/2017 |
| EP | 3 264 073 A1 | 1/2018 |
| EP | 3 309 899 A1 | 4/2018 |
| WO | 0138902 A2 | 5/2001 |
| WO | 2009148397 A1 | 12/2009 |
| WO | WO-2014019778 A1 * | 2/2014 ............ G01S 13/89 |
| WO | 2017076574 A1 | 5/2017 |

OTHER PUBLICATIONS

German Office Action issue in German Application No. 10 2018 211 422.6, dated Jun. 30, 2019, 1 page.
International Preliminary Report on Patentability and Written Opinion of the International Searching Authority issued in PCT Application No. PCT/EP2019/067699 dated Jan. 26, 2021, 8 pages.

* cited by examiner

FILL STATE RADAR ANTENNA ASSEMBLY FOR MEASURING THE FILL STATE IN A CONTAINER

REFERENCE TO RELATED APPLICATIONS

The present application claims the priority of German patent application No. 10 2018 211 422.6, filed on 10 Jul. 2018, which is fully incorporated by reference in the present document.

TECHNICAL FIELD

The present invention relates to a level radar antenna assembly for measuring a level in a container, a level radar device with such a level radar antenna assembly and a container with such a level radar device.

BACKGROUND OF THE INVENTION

Radar sensors for measuring the level in a vessel in which a product is stored are known in the state of the art. The antennas for transmission and reception are arranged separately, which considerably increases the performance of a radar sensor.

EP 3 165 883 A9 reveals a level radar sensor for external mounting on a closed ceiling of a container, with a shield for shielding signal components of the transmitted signal which were reflected at the ceiling of the container, so that reception of these signal components by the receiving antenna assembly is prevented.

SUMMARY OF THE INVENTION

It is an object of the present invention to improve the measurement of a level in a vessel by radar sensors while keeping the space required for a level measuring device as small as possible.

This object is solved by a level radar antenna assembly for measuring a level in a container, a level radar device with such a level radar antenna assembly, and a container with such a level radar device. Advantageous embodiment and further developments can be found in the subclaims and the following description.

The level radar antenna assembly for measuring a level in a container has a transmitting antenna assembly, a receiving antenna assembly and a housing. The transmitting antenna assembly is configured to transmit a transmission signal in the direction of a product surface of a product stored in the container and the receiving antenna assembly is configured to receive a transmission signal reflected at the product surface. The transmitting and receiving antenna assemblys are completely or partially integrated in the housing or at least fixed to the housing, the transmitting antenna assembly being larger than the receiving antenna assembly.

A container whose fill level is to be determined can be filled with a filling material. The filling material can be a liquid medium, such as water or chemicals, or a solid, such as sand, granulate or similar. The level radar antenna assembly may be mounted on an outer side of the container, preferably on a container ceiling. In this case, the container ceiling can be the part of the container which is positioned opposite to the product, i.e. in the upper area of the container during proper operation. The container may have a window through which the level radar antenna assembly can measure the level. Alternatively, it may be provided that the level measurement by the level radar antenna assembly is performed through a wall of the container, provided that the container is not made of metal.

The level radar antenna assembly can be located on a side of the container side or the container lid facing the product. Thus it is not necessary to open the container to measure the level of the product.

In the housing of the level radar antenna assembly, the transmitting antenna assembly and the receiving antenna assembly may be arranged separately. For example, they can be arranged side by side and/or offset to each other. Preferably, the transmitting antenna assembly and receiving antenna assembly may be arranged next to each other in the same housing, which saves space in the level radar antenna assembly. This assembly also allows the transmitting and receiving antenna assembly to be automatically correctly aligned with each other, so that no adjustment of the transmitting antenna assembly and receiving antenna assembly against each other is necessary.

To transmit a transmission signal, a transmission signal can be radiated from the transmitting antenna assembly in the direction of the product surface through a window on the container ceiling or also through the plastic housing of the container. A transmitted signal component reflected on the product surface can be detected by the receiving antenna assembly. The transmitting antenna assembly and the receiving antenna assembly are designed in different sizes. The emitting antenna assembly requires a minimum size to have sufficiently good radiation characteristics to fulfil, e.g. a desired focusing of the emitted signal in the direction of the product or compliance with standards and regulations. In contrast, the receiving antenna assembly can be considerably smaller so that it receives just enough energy of the reflected signal to be able to process and evaluate it in the desired quality. In this way, a respective minimum size of the transmitting antenna assembly and receiving antenna assembly can be selected in order to make the level radar antenna assembly as compact as possible, which allows a space-saving design of the level radar antenna assembly.

The transmitting and receiving antenna assemblys may be integrated in one housing together with other components such as a battery, a display and a communication device. The housing of the level radar antenna assembly can be made of plastic, glass or metal, for example. The housing can be designed to be mounted on the surface of a container. For this reason, the housing can be, for example, cubic, cylindrical, conical or hemispherical.

A particular advantage of the present invention is that the level radar antenna assembly can be made compact by using the transmitting antenna assembly and receiving antenna assembly with a minimum size which meets transmission and reception requirements. By using a radar sensor, the level radar antenna assembly for measuring the level can be easily mounted on the outside of a container without having to open the container. The container should be made of material which is transparent to radar radiation.

Furthermore, it is possible to reduce or even completely eliminate interfering effects during measurement through the container ceiling. There are numerous advantages for the user by using the separate transmitting and receiving antenna assembly, e.g. simpler commissioning of the sensor, no cumbersome electronic interference signal suppression, a reduction of the dead zone of the sensor or an enlargement of the measuring range (useful range). Furthermore, it is possible that the "ringing" can be significantly reduced by separating the transmitting and receiving antenna assembly, which brings considerable advantages especially in the close range, where the echo signal is not or at least less pronouncedly overlaid by the ringing.

Especially for IBC containers (IBC: Intermediate Bulk Container), accurate measurement at close range is advantageous when the container is almost full.

In one embodiment, the transmitting antenna assembly or the receiving antenna assembly has an aperture radiator. Aperture radiators or horn radiators are antennas which radiate or receive electromagnetic energy via a radiating opening (aperture). Aperture radiators or horn radiators belong to area antennas which convert a wave guided by a waveguide at an area extension, for example at an opening (aperture) in a waveguide system, into free space waves and vice versa. In this way, the field distribution of the wave fed in is largely maintained and the transition into free space is almost free of reflections. For these reasons, the radar sensor is arranged in the opposite direction of the product and the waveguide and the aperture are arranged in the direction of the product.

In one embodiment, an aperture of the transmitting antenna assembly is larger than an aperture of the receiving antenna assembly.

In one embodiment, an effective area of the aperture of the transmitting antenna assembly is more than twice as large as an effective area of the aperture of the receiving antenna assembly.

To meet the radiation requirements, the transmitting antenna assembly may have a minimum size or minimum area of the aperture required to focus the transmitted signal into a free space. To achieve sufficient signal quality, it may be advantageous for the receiving antenna assembly to have a minimum size or minimum area of the aperture to focus a received signal. Thus, the aperture or effective area of the transmitting antenna assembly can be larger than the aperture or effective area of the receiving antenna assembly, preferably more than twice as large as the aperture of the receiving antenna assembly. The aperture can be designed in different shapes, e.g. round, elliptical or rectangular, and the size of the aperture can be determined by means of a diameter or a diagonal length of the respective aperture.

In one embodiment, the sum of the aperture areas of the transmitting antenna assembly and receiving antenna assembly is greater than 50% and preferably greater than 90% of an area of the housing on which the apertures of the transmitting antenna assembly and receiving antenna assembly are arranged.

The housing can be configured as compact as possible. The transmitting antenna assembly and receiving antenna assembly can be arranged close together. In addition, the apertures of the transmitting antenna assembly and receiving antenna assembly can largely occupy the area where the apertures of the transmitting antenna assembly and receiving antenna assembly are arranged. In this way, the sum of the aperture areas of the transmitting antenna assembly and receiving antenna assembly can be at least 50%, preferably 90% of the area of the housing where the apertures of the transmitting antenna assembly and receiving antenna assembly are arranged.

In one embodiment, the transmitting antenna assembly has a horn antenna. In one version, the receiving antenna assembly has a horn antenna. Aperture radiators or horn radiators are antennas which radiate or receive electromagnetic energy via a radiating opening (aperture). A horn antenna or horn radiator is an antenna for microwaves made of a metal body approximating the shape of an exponential funnel or a hollow cone, i.e. an exponential line, which is often fed via a waveguide. Aperture radiators usually have the shape of a waveguide, which gradually widens to form a horn. The larger the geometric dimensions of the effective area of the horn radiator in comparison to the wavelength, the more the radiated power is bundled, resulting in a high directivity factor. For this reason, the transmitting and/or receiving antenna assembly may include a horn antenna. The horn antenna can have different horn radiator shapes such as a pyramid, conical or exponential shape.

In one embodiment, the horn antenna has a lens. A lens can be applied to the aperture of the horn antenna, which can be used to further focus the transmitted or received signal.

In one embodiment, the transmitting antenna assembly has a patch antenna. In one version, the receiving antenna assembly has a patch antenna. As an alternative to the aperture radiator, the transmitting antenna assembly and/or the receiving antenna assembly can include a patch antenna. The patch antenna is a mostly rectangular metal surface, the long side of which corresponds to the length of half the wavelength. The patch antenna can also be designed as an assembly. The assembly can comprise several individual metal surfaces, each of which can have a long side with half the wavelength. This means that the metal surface acts as a resonator and the patch antenna can have a directional effect. By using a flat radiating element, i.e. a patch antenna, manufacturing costs can be reduced and a simple construction of the separate transmitting and receiving antenna assembly can be ensured. Therefore different designs of the level radar antenna assembly are possible:

i) Transmitting antenna assembly—horn antenna, receiving antenna assembly—horn antenna
  ii) transmitting antenna assembly—horn antenna, receiving antenna assembly—patch antenna
  iii) transmitting antenna assembly—patch antenna, receiving antenna assembly—horn antenna
  iv) transmitting antenna assembly—patch antenna, receiving antenna assembly—patch antenna The present invention further comprises a level radar device having a level radar antenna assembly as described above. The fill level radar device may further comprise a battery for operating the fill level radar device, a display for showing, for example, the fill level in a container in which a filling material is stored, and/or a communication means for transmitting the fill level, for example via Bluetooth, WLAN, etc. The fill level radar antenna assembly integrated in the fill level radar device enables the fill level radar device to be mounted on an outer side of the container, preferably on an outer container top. In this way, the container can remain closed despite a reliable measurement of the fill level. By placing the transmitting antenna assembly and the receiving antenna assembly next to each other in the fill level radar antenna assembly, the fill level radar unit can be built up compactly, which contributes to the practical and easy handling of the fill level radar unit.

The present invention further comprises a container having a fill level radar device as described above. The container can be made of plastic, glass or metal. The container can be, for example, an IBC container (IBC: Intermediate Bulk Container) or a GRP tank (GRP: glass fibre composite), which stores a filling material and is closed by a lid. The container ceiling can preferably have a window of, for example, plastic, glass or ceramic, which allows the transmission and reception signals from the level radar antenna assembly to be transmitted.

In one embodiment, the material of the container where the fill level radar unit is installed is identical to a material of the housing of the fill level radar antenna assembly. In this way, an impedance jump of the transmitted and received signals between the level radar antenna assembly and the container can be avoided, which enables a precise measurement of the fill level in the container.

Further features, advantages and possible applications of the present invention result from the following description, the embodiments and the figures. All described and/or pictorially depicted features can be combined with each other in individual claims, figures, sentences or paragraphs regardless of their representation. In the figures, the same reference signs stand for identical or similar objects.

SHORT DESCRIPTION OF THE FIGURES

DETAILED DESCRIPTION OF EMBODIMENTS

Figure 1:
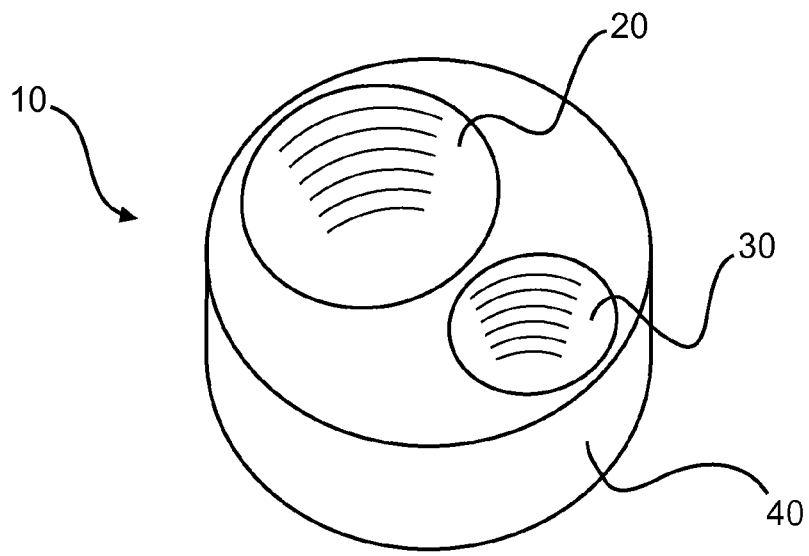
FIG. 1 shows a level radar antenna assembly according to an embodiment of the invention.
Figure 2:
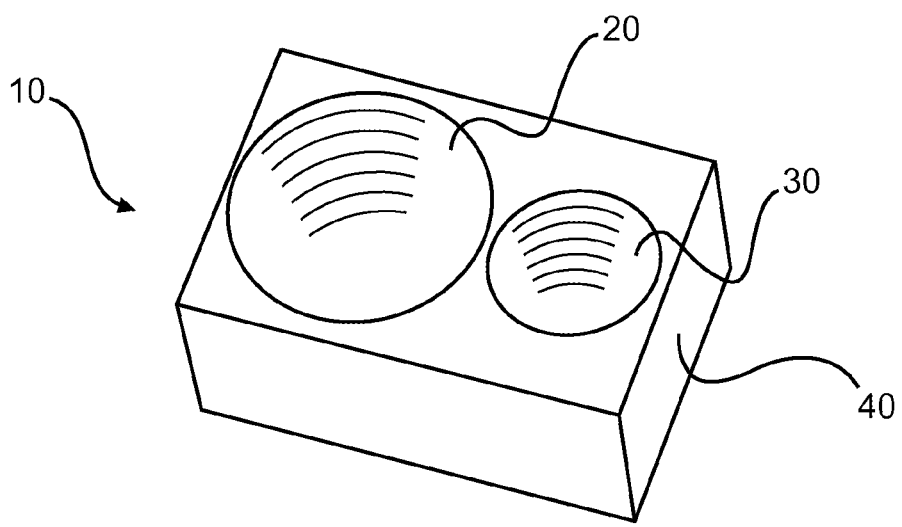
FIG. 2 shows a level radar antenna assembly according to another embodiment.

FIGS. 1 and 2 show a level radar antenna assembly 10 for measuring a level in a container. The level radar antenna assembly 10 has a transmitting antenna assembly 20 and a receiving antenna assembly 30. The transmitting antenna assembly 20 transmits a transmitted signal in the direction of a product surface of a product stored in the container and the receiving antenna assembly 30 receives a transmitted signal reflected at the product surface. The transmitting antenna assembly 20 and the receiving antenna assembly 30 are arranged side by side in a housing 40. Thus, no adjustment of the transmitting antenna assembly and receiving antenna assembly against each other is necessary. The housing 40 can be square, conical, cylindrical or hemispherical and can, for example, be made of the same material as the container. The transmitting antenna array 20 and the receiving antenna array 30 have an aperture radiator, whereby one aperture of the transmitting antenna assembly 20 is larger than the aperture of the receiving antenna assembly 30. For example, a diameter of the aperture of the transmitting antenna assembly 20 may be more than twice as large as a diameter of the aperture of the receiving antenna assembly 30. In particular, the transmitting antenna assembly 20 can have a minimum size which fulfils radiation requirements, e.g. focusing of the transmitted signal in the direction of the product. In contrast, the receiving antenna assembly 30 can be considerably smaller so that it receives just enough energy of the reflected signal to be able to process and evaluate it in the desired quality. Nevertheless, the receiving antenna assembly 30 should be sufficiently large to receive the signal. Furthermore, in order to make the housing 40 and thus the level radar antenna assembly 10 as compact as possible, the sum of the aperture areas of the transmitting antenna assembly and the receiving antenna assembly can be larger than 50% and preferably larger than 90% of an area of the housing where the apertures of the transmitting antenna assembly and receiving antenna assembly are located. In FIG. 1 and FIG. 2 a horn antenna with lens is used for the transmitting antenna assembly 20 and receiving antenna assembly 30. Optionally, the transmitting and/or receiving antenna assembly can have a lens for further focusing of the signal.

Figure 3:
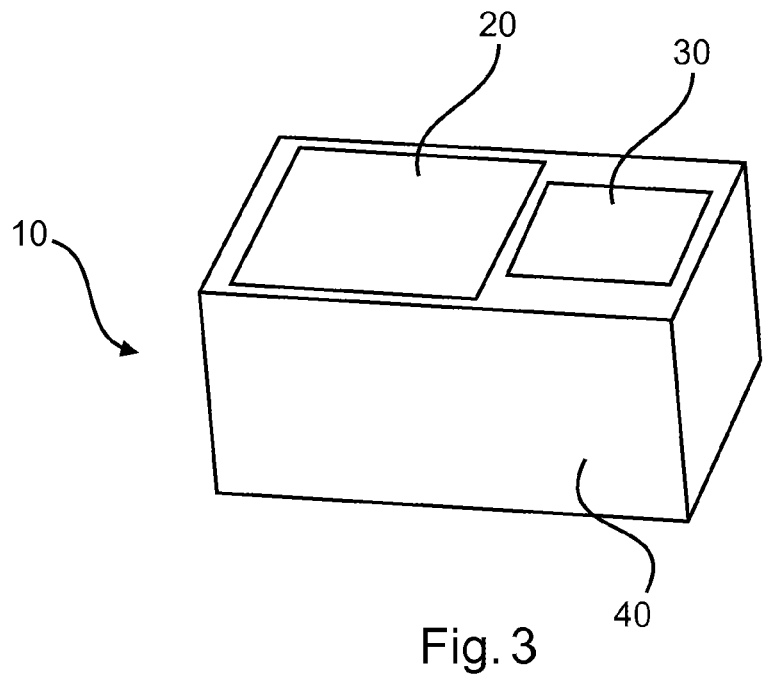
FIG. 3 shows a level radar antenna assembly according to another embodiment.

FIG. 3 shows a level radar antenna assembly 10, where the transmitting and receiving antenna assemblys are designed as patch antennas. The patch antenna enables a simple construction of the level radar antenna assembly 10 and a more cost-effective production of the level radar antenna assembly 10. Even when using the patch antenna, the transmitting antenna assembly 20 can be larger than the receiving antenna assembly 30. In particular, an antenna area of the transmitting antenna assembly 20 can be more than twice as large as the antenna area of the receiving antenna assembly 30 to focus the transmitted signal sufficiently.

Figure 4:
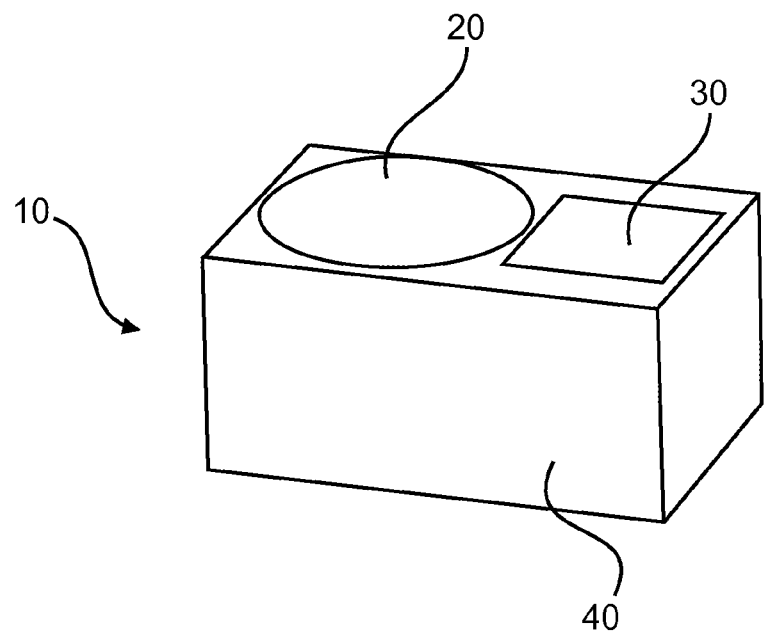
FIG. 4 shows a level radar antenna assembly according to another embodiment.

FIG. 4 shows a level radar antenna assembly 10, where the transmitting antenna assembly 20 is a horn antenna and the receiving antenna assembly 30 is a patch antenna. Here, too, the transmitting antenna assembly 20 can have a minimum size which is larger than the antenna area of the receiving antenna assembly 30 and fulfils the radiation requirements, e.g. focusing of the transmitted signal in the direction of the product. In FIG. 4, a lens for further focusing of the signal is attached to the transmitting antenna assembly 20.

It should be added that "comprising" and "having" does not exclude other elements or steps and "a" or "an" does not exclude a plurality. It should also be noted that features or steps described by reference to one of the above design examples may also be used in combination with other features or steps of other design examples described above. Reference marks in the claims are not to be considered as restrictions.

LIST OF REFERENCE SIGNS

10 Level radar antenna assembly
20 Transmission antenna assembly
30 Receiving antenna assembly
40 Housing

The invention claimed is:

1. A level radar antenna assembly for measuring a level in a container, comprising:
   a transmitting antenna assembly for transmitting a transmission signal in a first direction of a product surface of a product stored in the container, wherein the transmitting antenna assembly comprises a first aperture radiator;
   a receiving antenna assembly for receiving the transmission signal reflected at the product surface, wherein the receiving antenna assembly comprises a second aperture radiator; and
   a unitary housing,
   wherein the transmitting antenna assembly and the receiving antenna assembly are integrated in the unitary housing,
   wherein the transmitting antenna assembly is larger than the receiving antenna assembly,
   wherein the first aperture radiator comprises a first aperture and the second aperture radiator comprises a second aperture, the first aperture being greater than the second aperture, and
   wherein the transmitting antenna assembly and the receiving antenna assembly are spaced apart in a second direction transverse to the first direction within the unitary housing.

2. The level radar antenna assembly according to claim 1, wherein an effective area of the first aperture is more than twice as large as an effective area of the second aperture.

3. The level radar antenna assembly according to claim 2, wherein the sum of the first and second aperture areas is greater than 50% or more of an area of the unitary housing on which the first and second apertures are arranged.

4. The level radar antenna assembly according to claim 1, the transmitting antenna assembly further comprises a horn antenna.

5. The level radar antenna assembly according to claim 1, the receiving antenna assembly further comprises a horn antenna.

6. The level radar antenna assembly according to claim 4, wherein the horn antenna comprises a lens.

7. The level radar antenna assembly according to claim 1, wherein the transmitting antenna assembly comprises a patch antenna.

8. The level radar antenna assembly according to claim 1, wherein the receiving antenna assembly comprises a patch antenna.

9. A level radar device with the level radar antenna assembly according to claim 1.

10. A container with the level radar device attached to the level radar antenna assembly according to claim 9.

11. The container according to claim 10, wherein a material of the container where the level radar device is mounted is identical to a material of the unitary housing of the level radar antenna assembly.

12. The level radar antenna assembly according to claim 5, wherein the horn antenna comprises a lens.

* * * * *